(12) United States Patent
Mendonsa et al.

(10) Patent No.: US 10,446,186 B1
(45) Date of Patent: Oct. 15, 2019

(54) DATA STORAGE CARTRIDGE WITH MAGNETIC HEAD-DISC INTERFACE (HDI)

(71) Applicant: Seagate Technology LLC, Cupertino, CA (US)

(72) Inventors: Riyan Alex Mendonsa, Edina, MN (US); Jason Bryce Gadbois, Shakopee, MN (US); Tim Rausch, Farmington, MN (US); Brett R. Herdendorf, Mound, MN (US); Krishnan Subramanian, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/135,634

(22) Filed: Sep. 19, 2018

(51) Int. Cl.
*G11B 5/54* (2006.01)
*G11B 5/55* (2006.01)
*G11B 23/03* (2006.01)
*G11B 19/20* (2006.01)
*G11B 19/28* (2006.01)

(52) U.S. Cl.
CPC ........ *G11B 23/0323* (2013.01); *G11B 19/209* (2013.01); *G11B 19/28* (2013.01)

(58) Field of Classification Search
CPC ......... G11B 33/122; G11B 5/54; G11B 5/588; G11B 5/5569; G11B 5/5521; G11B 5/55
USPC ........ 360/75, 73.03, 265.6, 106, 264.7, 270, 360/55, 69
See application file for complete search history.

(56) References Cited

U.S. PATENT DOCUMENTS

| 4,346,416 | A | 8/1982 | Riggle et al. |
| 4,675,856 | A | 6/1987 | Rudy et al. |
| 4,937,690 | A | 6/1990 | Yamashita et al. |
| 5,664,284 | A | 9/1997 | Brzoska |
| 6,636,778 | B2 | 10/2003 | Basham et al. |
| 6,957,291 | B2 | 10/2005 | Moon et al. |
| 7,251,088 | B2 * | 7/2007 | Matsui ................. G11B 5/5569 360/55 |
| 8,620,640 | B2 | 12/2013 | Sandorfi et al. |
| 9,183,087 | B2 | 11/2015 | DeCenzo |
| 2015/0362968 | A1 | 12/2015 | Jurey et al. |
| 2016/0253108 | A1 | 9/2016 | Jurey et al. |
| 2017/0242613 | A1 | 8/2017 | Shaw, II et al. |

FOREIGN PATENT DOCUMENTS

KR 100630739 B1 10/2006

* cited by examiner

*Primary Examiner* — Nabil Z Hindi
(74) *Attorney, Agent, or Firm* — Hall Estill Attorneys at Law (57) ABSTRACT

Apparatus for data storage in a cartridge library archival system. In some embodiments, a plurality of portable data storage cartridges are provided. Each cartridge has a sealed housing which encloses at least one head-disc interface (HDI) with a magnetic data transducer adjacent a rotatable data recording medium. An access station has control electronics configured to transfer data signals between a memory and the transducer of a selected cartridge loaded to the access station. The access station further has an external voice coil motor (VCM) configured to engage and advance the transducer of the selected cartridge across a recording surface of the medium. A transport mechanism can be used to automatically load the cartridges to the access station. Multiple cartridges can be loaded sequentially or concurrently to support various data transfer operations.

20 Claims, 5 Drawing Sheets

DATA STORAGE CARTRIDGE WITH MAGNETIC HEAD-DISC INTERFACE (HDI)

SUMMARY

Various embodiments of the present disclosure are generally directed to a cartridge library archival storage system that stores data using rotatable magnetic recording media and associated magnetic data read/write transducers.

In some embodiments, a plurality of portable data storage cartridges are provided. Each cartridge has a sealed housing which encloses at least one head-disc interface (HDI) with a magnetic data transducer adjacent a rotatable data recording medium. An access station has control electronics configured to transfer data signals between a memory and the transducer of a selected cartridge loaded to the access station. The access station further has an external voice coil motor (VCM) configured to engage and advance the transducer of the selected cartridge across a recording surface of the medium. A transport mechanism can be used to automatically load the cartridges to the access station. Multiple cartridges can be loaded sequentially or concurrently to support various data transfer operations.

These and other features and advantages which characterize the various embodiments of the present disclosure can be understood in view of the following detailed discussion and the accompanying drawings.

DETAILED DESCRIPTION

The present disclosure generally relates to the use of removable cartridges with magnetic head-disc interfaces (HDIs) to store user data in a cartridge library archival system.

Mass storage systems use multiple data storage devices to provide a high data capacity non-volatile memory (NVM) storage space. The devices may be physically grouped together into a rack or other storage enclosure and operationally connected to provide a storage node in a larger network system.

A wide variety of data storage media are available in the art to provide NVM storage. These include solid-state memory (e.g., NAND flash), rotatable magnetic recording discs, rotatable optical discs, magnetic recording tape, etc. Each of these and other forms of storage media have various advantages and disadvantages including different effective transfer rates, access times, operational life, cost, etc.

Long term storage, also referred to as cold storage or archival storage, can be achieved using a cartridge library archival system having a population of portable data storage cartridges. The cartridges are arranged in a rack or other arrangement. A transport mechanism (e.g., robotic arm) selects and loads the various cartridges to a central read/write data access station to facilitate data transfer operations with data storage media housed within the cartridges. Such systems provide significant volumes of storage capacity, albeit at a relatively lower average data transfer rate as compared to other data storage systems where all of the storage media are maintained in a concurrently accessible state.

Various embodiments of the present disclosure are generally directed to an apparatus and method for storing data. As explained below, some embodiments provide a cartridge library archival system with a population of portable data storage cartridges arranged within a cabinet space (also referred to as a rack or enclosure). Each cartridge includes a sealed housing which encloses at least one rotatable magnetic recording medium (disc) and at least one data read/write transducer (head).

Each head is configured to be aerodynamically supported adjacent a magnetic recording surface of the corresponding disc by atmospheric currents established by high velocity rotation of the disc. The head(s) are radially advanced across the recording surface(s) using an actuator. The heads are configured to write data to data tracks defined on the recording surfaces.

Each combination of head and disc surface is referred to as a head-disc interface (HDI), so the cartridges of the present disclosure can be characterized as HDI cartridges each having at least one HDI. The sealed housing of each cartridge protects the HDI(s) from contaminants that may interfere with the operation of the cartridge.

A transport mechanism (e.g., a robotic arm) has an end effector configured to selectively load each of the cartridges in turn from an inactive location to an active location within the cabinet space. An access (read/write) station is provided at the active location and is adapted to receive the loaded cartridge.

The access station has an electrical interface and a mechanical interface. The electrical interface is configured to supply electrical power, data and control signals to active elements of the cartridge. The mechanical interface includes an external spindle motor and an external voice coil motor (VCM). The spindle motor is configured rotate the magnetic recording disc(s) at a selected rotational velocity. The external voice coil motor (VCM) is configured to rotate the actuator to position the heads adjacent the recording surfaces.

In this way, each cartridge in the present system as embodied herein resembles a conventional hard disc drive (HDD), but without certain mechanical and electrical features that would otherwise be necessary to enable the cartridge to operate in a stand-alone fashion. Each cartridge thus generally takes the form of an HDD minus a spindle motor, VCM, control electronics, and/or other elements that can be offloaded from the cartridge and supplied by the access station. The removal of these elements from the individual cartridges in favor of consolidation at the access station level allows the provision of a large scale, high capacity storage system with the benefits of magnetic disc storage at a significantly lower cost.

Figure 1:
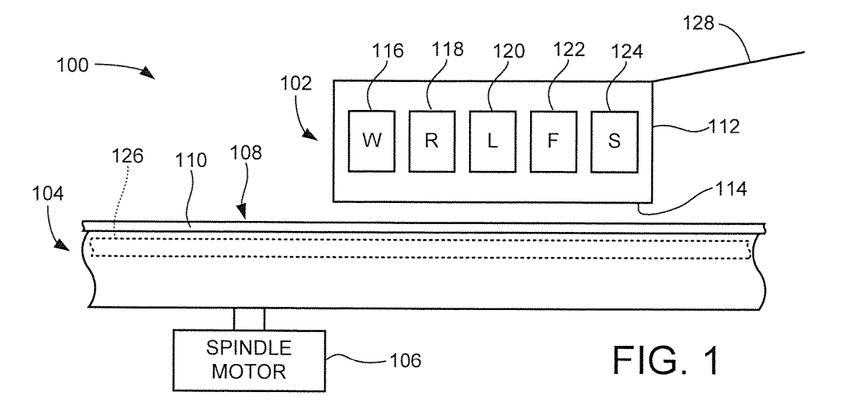
FIG. 1 provides a functional block representation of a head-disc interface (HDI) in accordance with various embodiments of the present disclosure.

These and other features and advantages of various embodiments of the present disclosure can be understood beginning with a review of FIG. 1 which shows aspects of a data storage system 100. The system 100 includes a read/write data transducer (head) 102 adjacent a rotatable magnetic recording medium (disc) 104. The disc 104 is configured to be rotated at a selected rotational velocity by a spindle motor 106.

The disc 104 is provided with a data recording surface 108 to which data are written by the head 102 in a manner explained below. A thin layer of lubricant 110 may be maintained on the recording surface 108 to reduce damage from inadvertent contact between the head 102 and the disc 104. This combination of the magnetic head and the magnetic disc recording surface is referred to as a head-disc interface (HDI). While only a single HDI is shown in FIG. 1, it will be appreciated that a second HDI could be formed by supplying a second head nominally identical to the head 102 below the disc 104 to access a lower recording surface on the opposite side of the recording surface 108.

The head 102 includes a slider 112 having an air bearing surface (ABS) 114 in facing relation to the disc surface 108. The ABS 114 is configured to maintain the slider 112 in a stable aerodynamically supported relation to the disc 104 responsive to atmospheric currents established by the high speed rotation of the disc. While the slider 112 is shown to be nominally parallel to the disc, in practice the slider may "fly" at a selected attitude with, for example, a trailing edge that is maintained closer to the recording surface as compared to a leading edge of the slider.

Various active elements are incorporated in or on the slider 112 to support data transfer operations with the disc 104. The elements shown in FIG. 1 include a write element (W) 116, a read sensor (R) or reader 118, a laser diode (L) 120, a fly height adjustment mechanism (F) 122 and a sensor (S) 124. These various elements are merely illustrative and are not limiting, so that one or more of these elements may be omitted and one or more other elements (e.g., microactuators, NFTs, temperature sensors, etc.) may be incorporated into the head design as required.

The write element 116 may take the form of a magnetic write coil adapted to establish a time varying magnetic field to write a corresponding magnetic pattern to an embedded recording layer 126 of the recording surface 108. Without limitation, it is contemplated that the write element takes the form of a perpendicular magnetic write coil with an associated magnetically permeable pole structure, although other forms can be used.

The reader 118 may take the form of a magneto-resistive (MR) sensor adapted to detect the magnetization pattern written by the write element responsive to changes in amplitude of a bias current passed through the sensor to magnetic fields produced by the selective magnetization of the surface 108. The reader 118 thus senses and returns the data previously written to the recording layer 126.

The laser diode 120 forms a portion of a heat assisted magnetic recording (HAMR) system which directs electromagnetic energy to provide localized heating of the storage disc 104 during a write operation. The HAMR system raises the temperature of the media to a level at or above the Curie temperature of the media, thus temporarily lowering the magnetic coercivity of the media to facilitate the writing of data to the recording layer.

The fly height adjustment mechanism 122 may include a resistive element or similar structure that adjusts the fly height (clearance distance) between the slider 112 and the surface 108 through thermal expansion of the slider 112. The sensor 124 may be a contact sensor, proximity sensor, or other form of sensor used to detect changes in the relative fly height of the slider during operation.

The slider 112 is mechanically supported by a head gimbal assembly (HGA) 128 that positions the slider adjacent different radial locations across the surface 108. The HGA 128 may be configured to allow the slider to rotate over a limited range along multiple axes (e.g., pitch, yaw, roll) during flight of the slider adjacent the rotating disc.

Figure 2:
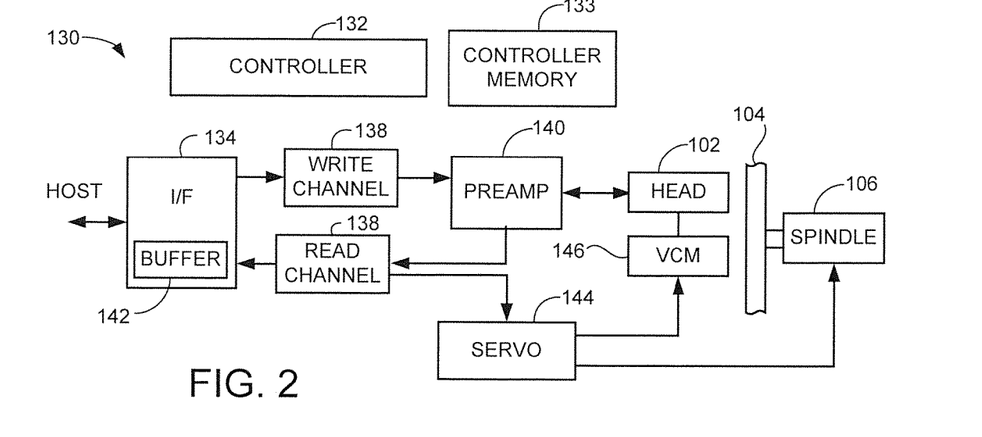
FIG. 2 shows a data storage system that uses one or more HDIs as depicted in FIG. 1.

FIG. 2 shows a functional block diagram of a data storage system 130 that incorporates one or more HDIs as described in accordance with FIG. 1 in some embodiments. The system 130 includes a top level controller 132 that provides overall communication and control of the system during data transfers with a host device (not separately shown). The controller 132 may take the form of a hardware circuit and/or one or more programmable processor circuits that execute program instructions (e.g., firmware) stored in a controller memory 133.

A data path is established through the system in the form of circuitry which includes a host interface (I/F) 134, channel electronics including a write channel 136 and a read channel 138, and a preamplifier/driver circuit (preamp) 140. A buffer memory 142 temporarily stores data sets during data transfer operations between the host and the HDI(s).

To perform a write operation, the host supplies a write command along with associated user data (write data) to be written to the system 130. The write data are arranged into fixed-sized addressable blocks (e.g., logical block addresses or LBAS) which are encoded by the write channel 138 and supplied to the preamp 140, which in turn applies appropriate bi-directional write currents to the write element 116 (see FIG. 1) to write the associated write data, as encoded by the write channel, to the associated disc 104.

To perform a read operation, the host supplies a read command for a requested set of user data (also referred to as read data or readback data). The read data are sensed by the reader 118 through magnetic interaction with the recording layer 126, conditioned by the preamp 140, and processed by the read channel 138 to return the requested data to the host.

A given write or read command will include instructions to transfer an identified number of identified blocks of user data by logical address (e.g., LBAs). While LBAs are used as an illustrative example of logical block addressing, other addressing techniques can be used including key-values, etc. The system 130 will maintain map structures that track the physical addresses (e.g., physical block addresses or PBAs) at which the various LBAs are stored within the system.

A closed loop servo control circuit 144 positions the head(s) 102 adjacent the associated disc(s) 104 to carry out these and other data access operations. Servo control data are written to the various data recording surfaces 108 (FIG. 1), demodulated by a demodulation portion of the read channel 138 and supplied as a position input to the servo circuit 144. In response, the servo circuit 144 applies a control input such as a control current to a voice coil motor (146) coupled to the head(s) 102. The servo circuit 144 also supplies velocity control inputs such as spindle motor currents to the spindle motor 106 to maintain the discs at the desired rotational rate.

Figure 3A:
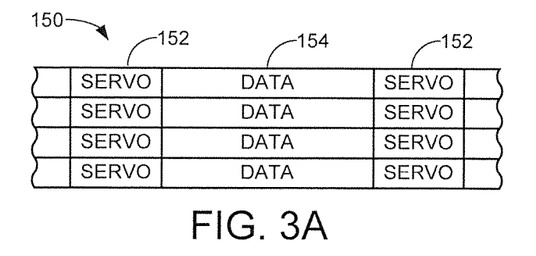
FIGS. 3A and 3B illustrate different track formats that can be used in some embodiments.

The various data recording surfaces 108 may be arranged to have a population of data tracks, such as denoted at 150 in FIG. 3A. The data tracks 150 include embedded servo fields 152 that are angularly spaced about the associated surface and may extend radially across the associated surface like spokes of a wheel. Between each pair of adjacent servo fields 152 along a given radius is a data region 154 in which one or more data sectors are arranged to store user data. Each data sector may be configured to store a fixed amount of user data, such as 512 bytes (B), 1024 B, 4096 B, etc.

Figure 3B:
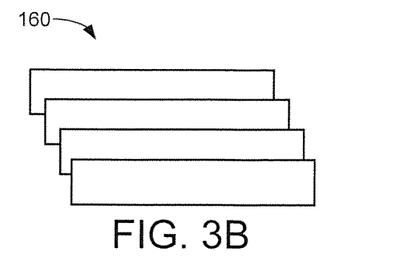

In some cases, shingled magnetic recording (SMR) techniques may be applied as shown by a set of shingled tracks 160 in FIG. 3B. SMR generally involves writing a band of tracks such that each successively written track partially overlaps a previously written track in the band. This takes advantage of the fact that the effective width of a write element such as 116 (FIG. 1) may be wider than the effective width of the associated reader (118). In such case, greater data densities can be achieved on the recording surface by initially writing the tracks in relation to the effective operational capabilities of the write element, followed by trimming the radial width of the tracks to a width that corresponds to the detection capabilities of the reader.

The various tracks 150, 160 can be nested concentric tracks so that each track is written at a different nominal radius, or the tracks can be spiral tracks that continuously advance in a selected radial direction (e.g., toward the innermost or outermost diameter of the disc).

Figure 4:
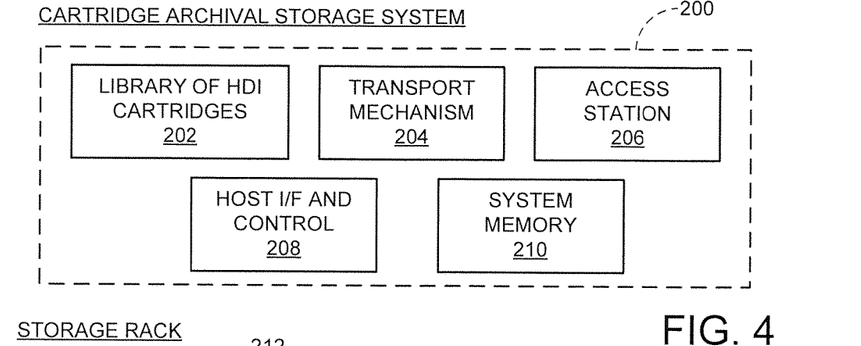
FIG. 4 is a functional block diagram for a cartridge archival storage system in accordance with various embodiments.

In accordance with various embodiments, the system 130 depicts aspects of a cartridge library archival storage system 200, a functional block representation of which is provided in FIG. 4. Generally, the system 200 operates as a mass storage system to supply large scale data storage capabilities for archive data, that is, data that do not necessarily need to be immediately accessible when requested.

Archive data are sometimes referred to as cold data, in that the system will be configured to tolerate a significantly larger amount of delay before a data access operation can be performed; that is, there may be a significant amount of delay before write data can be written to the system or read data can be retrieved from the system in response to a host command. Depending on the system configuration, the delay associated with cold storage can be measured in the range of, without limitation, several hundred milliseconds, ms to several seconds or more.

This is in contrast to so-called hot data, which are generally required to be accessible immediately, that is, with a relatively small amount of delay such as (without limitation) on the order of less than a ms to a few ms or more. It will be appreciated that terms such as "hot data" and "cold data" are necessarily relative and inexact, and will depend on the styles and arrangements of the media types and controller capabilities. The terms are nonetheless useful in a data storage context to those having skill in the art and who have real life experience designing and working with such systems.

Whatever overall performance capabilities exist in a given system, hot data are the types of data that are given priority and assigned to regions in a memory hierarchy that promote efficient read and write transfers at a relatively high data transfer rate. Examples of such hot data processing systems include multi-device storage enclosures in which multiple storage devices, such as SSDs, hybrid SSDs, HDDs, etc. are concurrently maintained in an operationally ready state to provide an operational random access memory space formed by such multiple devices to facilitate large scale data transfers at a rate dictated by limitations associated with the system (e.g. IOPS rates of processors and channels, etc.).

By contrast, cold data are understood to as types of data that are stored in relatively slower aspects of the memory hierarchy and thus may represent back up data, data that are referenced on a relatively infrequent basis, data for which a fast transfer is not necessarily mission critical, and so on. While not limiting, cold data storage often are arranged in such a way that the overall memory space is not immediately addressable without first taking some action to physically mate the recording media with the electronics necessary to facilitate and complete the data exchange requested by the user. The user understands that cold data storage provides significantly reduced data transfer rate performance as compared to hot data storage, but at the associated cost reduction that can be provided by cold data storage solutions.

The system 200 incorporates a number of elements, each of which will be discussed in detail below. These elements include a library or population of so-called HDI cartridges 202, a transport mechanism 204, an access station 206, a host I/F and control module 208, and system memory 210. In this context, the term "HDI cartridge" reflects the fact that the cartridge is configured as a nominally sealed housing in which is enclosed at least one HDI that is externally actuated.

Figure 5:
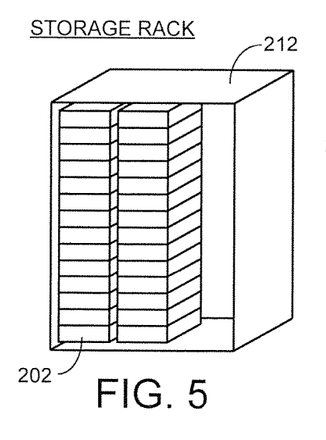
FIG. 5 shows a cabinet space of the system of FIG. 4.

The population of HDI cartridges 202 may be arranged in a cabinet space 212, as schematically depicted in FIG. 5. The cabinet space is also sometimes referred to as a rack, a storage rack, an enclosure, etc. The cartridges 202 will be arranged for ready access and manipulation by the transport mechanism 204 (not shown in FIG. 5). In some cases, the rack 212 will be adapted to fit within or otherwise have overall dimensions that correspond to an industry standard 42 U cabinet, or will other suitable dimensions to facilitate integration into existing data storage environments such as existing magnetic tape-based solutions.

The cartridges may each have a nominal form factor similar to existing HDD form factors, such as a 3½ inch form factor (e.g., nominally 146 mm by 101 mm), a 2½ inch form factor (e.g., nominally 101 mm by 73 mm), etc. In such case, the 3½ inch form factor cartridges may use rotatable magnetic recording media (e.g., magnetic recording discs 104) having an outermost diameter of 95 mm, 97 mm, etc., the 2½ inch form factor cartridges may use magnetic recording discs 104 with an OD of 65 mm, 67 mm, etc., and so on. In other cases, non-standard form factors may be supplied to the respective cartridges outermost dimensions, and various sizes of rotatable magnetic recording media can be used as required.

While any plural number of cartridges can be used in a given application, it is contemplated that the system can accommodate tens, hundreds or thousands of cartridges (or more) as required. Further, the system may be arranged to be scalable and modular such that sets of cartridges can be added, removed, replaced, etc. Because the individual cartridges are nominally sealed (as explained more fully below), the rack 212 can be open to facilitate air flow and heat conduction from the surrounding environment. On the other hand, because only one cartridge, or alternatively, only a relatively small subset of cartridges will be active at a given time, the rack can be closed off from the surrounding environment as desired since the overall heat generated by operation of the system will be significantly lower as compared to a system in which all of the cartridges were simultaneously active.

Figure 6:
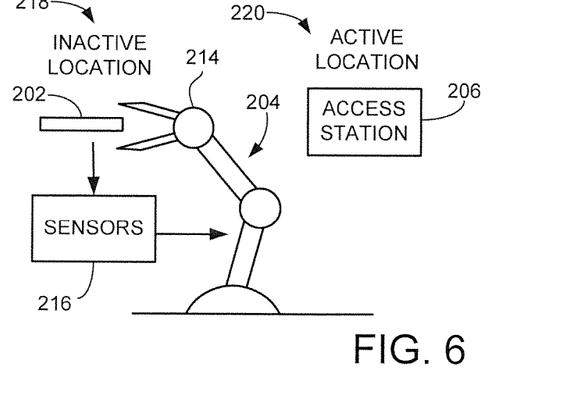
FIG. 6 depicts a transport mechanism of the system of FIG. 4.

FIG. 6 is a simplified schematic depiction of the transport mechanism 204 from FIG. 4. It is contemplated that the transport mechanism 204 may be characterized as a robotic arm that is adapted to individually locate, select, grasp, move and load the various cartridges 202 in turn into the access station 206. The transport mechanism 204 is further configured to remove an existing cartridge from the access station 206 and return the cartridge, such as to its previously stored location or to a different location within the rack. As such, the transport mechanism can take any number of forms apart from that generally represented in FIG. 6.

To this end, the transport mechanism 204 may include an end effector 214 adapted to mechanically grasp (e.g., establish a contacting engagement condition with) the selected cartridge. Various sensors 216 such as optical sensors, CCD elements, proximity sensors, etc. enable closed loop positional control of the transport mechanism The transport mechanism 204 will take a configuration suitable to the operative environment and, whatever form, will be adapted to transport each of the cartridges 202 in turn between an inactive location 218, such as a designated storage position within the rack 212 (see FIG. 5), and an active location 220, at which the access station 206 is positioned to enable transition of the selected cartridge from a deactivated state to an activated (operational) state. While an automated transport mechanism such as 204 is contemplated, such is not necessarily required. For example, in further embodiments the various cartridges may be loadable manually to the access station 206 by a user.

Figure 7:
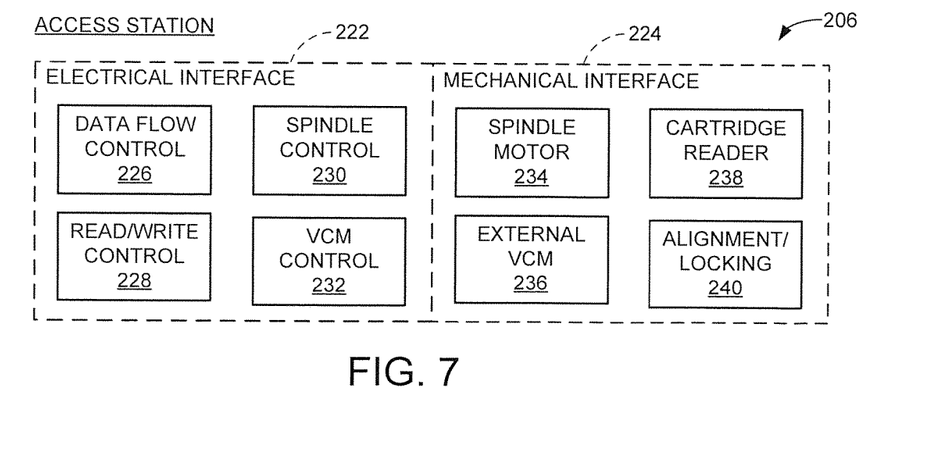
FIG. 7 is a functional representation of an access station of FIG. 4.

FIG. 7 shows a functional arrangement of the access station 206. The access station 206 can be characterized as incorporating two main subassemblies: an electrical interface 222 and a mechanical interface 224. It will be appreciated that the electrical and mechanical interfaces 222, 224, in combination with the native elements of the cartridge (discussed below), combine in such a way as to supply all of the elements of the system 130 discussed above in FIG. 2. While a particular embodiment for the access station 206 is shown in FIG. 7, other arrangements can be used as desired.

Generally, the electrical interface 222 supplies command, control and data signals to the selected cartridge 202 to facilitate a data access (e.g., read or write) operation. The mechanical interface 224 supplies the required mechanical inputs, most notably spindle and VCM actuation, during such access operation servicing.

The electrical interface 222 includes a data flow control circuit 226, a read/write control circuit 228, a spindle control circuit 230 and a VCM control circuit 232. Without limitation, the data flow control circuit 226 corresponds to the controller and host interface aspects of the system 130, the read/write control circuit 228 at least corresponds to the channel aspects of the system 130, and the spindle and VCM control circuits 230, 232 at least correspond to the servo aspects of the system 130. These elements form a portion of the access station 206 and are the same for each of the cartridges 202, apart from minor variations from one cartridge 202 to the next, such as different control parameters and other information stored in the system memory 210 that are individually associated with the different cartridges. Other circuitry can be incorporated into the electrical interface as well as desired such as amplifier circuits, head selection circuits, multiplexers, etc.

The mechanical interface 224 includes an external spindle motor 234, an external VCM 236, a cartridge reader 238 and various other miscellaneous elements associated with the alignment and locking (securement) of the selected cartridge 202 in the access station 206 as indicated by block 240. As described above in FIG. 2, the external spindle motor 234 operates to rotate the disc(s) at the desired rotational velocity and the external VCM 236 operates to rotate the head(s) to the desired radial positions.

The cartridge reader 238 represents a mechanism adapted to detect and confirm the correct cartridge has been loaded during a given cartridge access operation. Block 240 represents various alignment features such as locking pins, clamps, etc. that ensure the cartridge is securely and properly aligned within the access station. Block 240 also represents other aspects of the system such as electrical connectors that mate with various access locations of the cartridge, etc. As before, each of the elements of the mechanical interface are applied to each cartridge loaded to the access station.

Configuration aspects of the various HDI cartridges 202 will now be discussed beginning with a review of FIG. 8. As noted above, each cartridge 202 incorporates one or more HDIs in a nominally sealed housing to facilitate magnetic non-volatile memory (NVM) storage of data in a manner similar to that carried out in an HDD. To this end, the exemplary cartridge 202 in FIG. 8 includes a housing 242 to provide a sealed interior environment. Disposed within the housing is a disc stack 244 which incorporates one or more axially aligned magnetic recording discs 104 that are mounted to a disc hub assembly 246.

A rotary actuator 248 is disposed adjacent the disc stack to advance the head(s) 102 across the associated disc surfaces. As shown in FIG. 8, the actuator 248 pivots about a stationary pivot point beyond the OD of the disc stack 244 and includes one or more actuator arms 250 which generally project in a direction toward the disc stack. Each actuator arm 250 supports one or more HGAs 128 (see FIG. 1). A voice coil 252 extends from a central body portion of the actuator 248 opposite the actuator arms 250. While a rotary actuator is shown, other actuation configurations can be used including a linear actuator that advances the associated head(s) 102 in a substantially linear fashion across the disc(s) 104.

A flex circuit assembly 254 is coupled to the actuator 248 to provide data and control signal conduction paths to the active elements of the actuator (e.g., heads, voice coil). The flex circuit assembly 254 includes a flex circuit that forms a dynamic loop to maintain the conduction paths in electrical communication with the actuator without exerting excessive biasing forces upon the actuator as the heads 102 are radially translated across the discs 104.

The flex circuit loop terminates in a bulkhead connector 256 that extends through the housing 242 to facilitate interconnection with the electrical interface 222 of the access station 206 (see FIG. 7). While not separately shown for clarity, conductors are routed along the actuator arms and HGAs to the respective elements of the HDIs.

In some cases, the flex circuit assembly 254 incorporates a preamp circuit (see 140, FIG. 2) that is mounted to a side of the actuator 248 as shown. In this way, each cartridge 202 has its own local preamp 140. In other cases, the preamp 140 may be a single preamp incorporated into the electrical interface 222 of the access station 206, so that a single preamp drives all of the heads in each of the cartridges 202 and none of the cartridges 202 in the cartridge library has a separate, local preamp. Other consolidated circuitry such as signal amplifiers, head selection switches, etc. can be incorporated into the access station as required.

Other elements that may be incorporated into the HDI cartridge 202 include a ramp load/unload member 258 disposed adjacent the OD of the disc stack 244 to facilitate the unloading and securement of the heads 102 when the cartridge is not in use. Alternative, a contact start-stop (CSS) zone 260 can be provided as a texturized surface near the ID of the disc stack 244 to allow the heads 102 to safely come to rest during deactivated periods. One or more disc shrouds 262 may be arranged at other locations to shroud the OD of the disc stack, and internal recirculation filters 264 can be strategically placed to filter airborne contaminants during operation.

Substantially any other features can be incorporated into the cartridge 202 as well including humidity and atmospheric control features, disc separator plates, actuator latches, etc. In sum, each cartridge 202 generally resembles a stand-alone HDD except to the extent that elements thereof necessary to facilitate stand-alone operation of the cartridge are consolidated into the access station 206.

Figure 8:
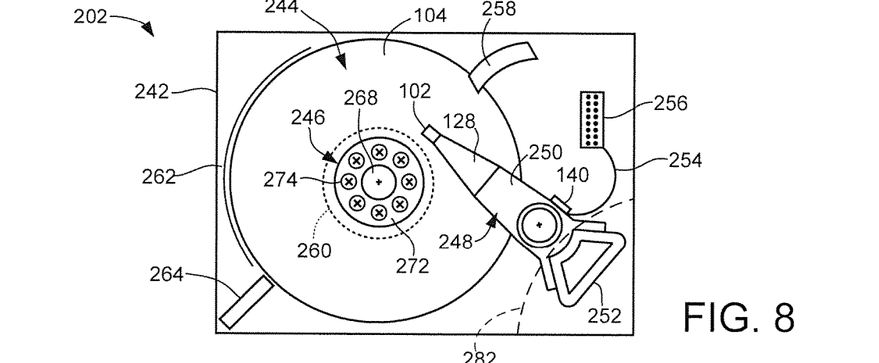
FIG. 8 is a schematic representation of an HDI cartridge in some embodiments.
Figure 9A:
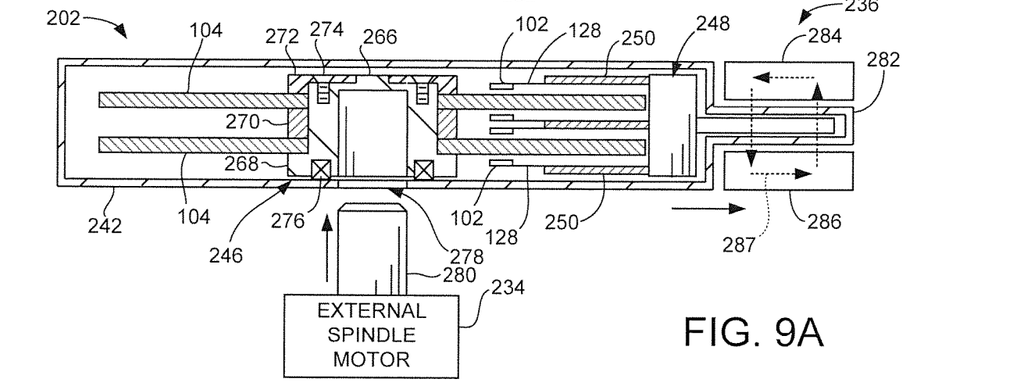
FIGS. 9A and 9B illustrate different activation schemes for the cartridge.

FIG. 9A shows an elevational cross-sectional view of the cartridge 202 of FIG. 8 in accordance with some embodiments. In the present example, it is contemplated that the cartridge incorporates two (2) magnetic recording discs 104, three (3) actuator arms 250 and four (4) heads 102 to provide a total of four (4) HDIs. Any respective numbers of these respective elements can be used as desired, so long as there is at least one disc surface and one associated head to provide at least one HDI within the cartridge.

The two discs 104 are mounted to the disc hub assembly 246 using a spindle hub 266 with a radially projecting hub flange 268 which supports the ID of the lowermost disc as shown. A disc spacer 270 establishes the desired separation distance between the discs. An upper disc clamp 272 clamps the discs and spacer in place using threaded fasteners 274. The disc hub assembly 246 is arranged to be rotatable within the housing 242 using an annular rotatable coupling 276. The coupling 276 may include one or more seals, bearings, etc. that facilitate rotation of the disc stack while sealing an aperture 278 that extends through the housing. In this way, remaining portions of the interior environment within the housing 242 remain sealed against the exterior environment.

The aperture 278 facilitates insertion of a spindle shaft 280 of the external spindle motor 234 (FIG. 7) into the spindle hub 266 when the cartridge 202 is loaded to the access station 206. This provides mechanical engagement between the spindle shaft 280 and the spindle hub 266, allowing rotation of the disc stack 244 upon activation of the spindle motor 234 and operation of the spindle control circuit 230.

The housing 242 is further provided with a thinned section 282 adjacent the voice coil 252. The thinned section 282 is in the vicinity of the coil and provides the housing with a significantly reduced height (e.g., in the direction parallel to the axis of disc rotation) as compared to remaining portions of the housing. The thinned section 282 facilitates insertion between upper and lower VCM magnets 284, 286 as depicted in FIG. 9A. The VCM magnets form a portion of the external VCM 236 of FIG. 7.

By using a non-magnetic (e.g., paramagnetic) material for the housing 242, the currents supplied by the VCM control circuit 232 of the access station 206 can be routed, via the flex circuit assembly 254, to the internal voice coil 252. Stated another way, a magnetic circuit 287 is established through magnetic interaction between the magnetic fields generated by the interior coil 252 the externally supplied magnetic field of the magnets 284, 286 to position the heads 102 as described above in FIG. 2.

In an alternative embodiment, one or more permanent magnets can be mounted to the actuator 248 within the housing 242 in replacement of the voice coil 252, and one or more external voice coils can be supplied to externally activate the actuator as before. An advantage of the former approach (external VCM magnets) is the potential similarity of the configuration of the actuator 248 to other HDDs that may be manufactured by a particular source, providing economics of scale in providing the HDI cartridges using similar manufacturing processes. An advantage of the latter approach (external VCM voice coil) is that the control currents need not be routed internally into the cartridge. In both cases, the body portion of the actuator 248 is supported for rotation within the confines of the housing 242, such as through the use of a conventional cartridge bearing assembly, etc.

It follows from FIG. 9A that insertion of the cartridge 202 into the access station 206 will include making the necessary electrical interconnections with the electrical interface 222 (such as via engagement with the bulkhead connector 256, FIG. 8), and making the necessary mechanical interconnections with the mechanical interface 244 including insertion of the thinned section 282 of the housing 242 into the space between the VCM magnets 284, 286 (or correspondingly, into the external VCM voice coil), and insertion of the spindle shaft 280.

The actual shape (e.g., areal extent, thickness in the vertical direction, etc.) of the thinned section 282 will depend on various factors including the size and orientation of the external magnets/coil, the relative position of the actuator within the cartridge, the side-to-side clearance requirements of the actuator as the actuator moves over its overall rotational stroke, etc. In some cases, the housing (or portions thereof) may be formed of injection molded plastic, aluminum or other metal, ceramics, composites (including mixtures of plastics and metal), or any other suitable rigid and, as necessary, non-magnetic materials that seal the interior of the housing while allowing the external aspects of the VCM to be in sufficient proximity to the interior of the housing to effect movement of the actuator through operation of the magnetic circuit.

Figure 9B:
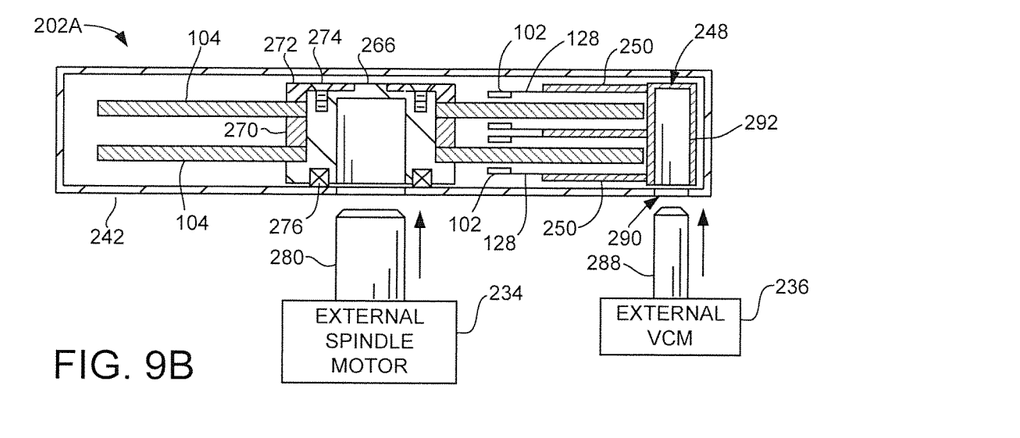

FIG. 9B shows an alternative cartridge 202A similar to the cartridge 202 discussed above. Like reference numerals have been used for similar components appearing in FIGS. 8 and 9A.

In FIG. 9B, direct engagement of the actuator 248 is supplied using an actuator shaft 288 which extends from the external VCM 236 through a corresponding aperture 290 in the housing 242 to mate with an actuator hub 292 of the actuator 248. In this way, the actuator shaft 288 engages the actuator hub 292 to radially advance the heads 102 across the disc surfaces in response to control inputs supplied to the external VCM 236. While not shown for purposes of clarity, a rotational coupling similar to the coupling 276 for the spindle hub can be used to seal the aperture 290 to maintain the desired internal atmosphere within the housing.

At this point, it will be understood that the term "external VCM" and the like will be understood consistent with the foregoing discussion to describe a system where either the entire VCM is external to the cartridge housing or at least a portion of the magnet(s) and coil(s) of the VCM are external to the cartridge housing, such as variously exemplified in FIGS. 8, 9A and 9B. In each case, the actuator has an actuation feature (e.g., internal voice coil 252, internal permanent magnet, internal actuator hub, etc.) that is externally actuated by the external VCM (e.g., magnetic fields, mechanical coupling, etc.), and the actuation feature is not independently operable to advance the heads without the external VCM being present to act thereon.

Similarly, the term "external spindle motor" and the like will be understood consistent with the foregoing discussion to describe a system where either the entire spindle motor is external to the cartridge housing or at least a portion of the spindle motor is external to the cartridge housing. For example, a stator portion with the associated coils, wiring, etc. could be inserted into the cartridge to mate with a rotor portion of the spindle motor with various magnets, etc. As before, the disc stack is not rotatable at the selected velocity without the external spindle motor being present to act thereon.

Figures 10A, 10B, 11, 12:
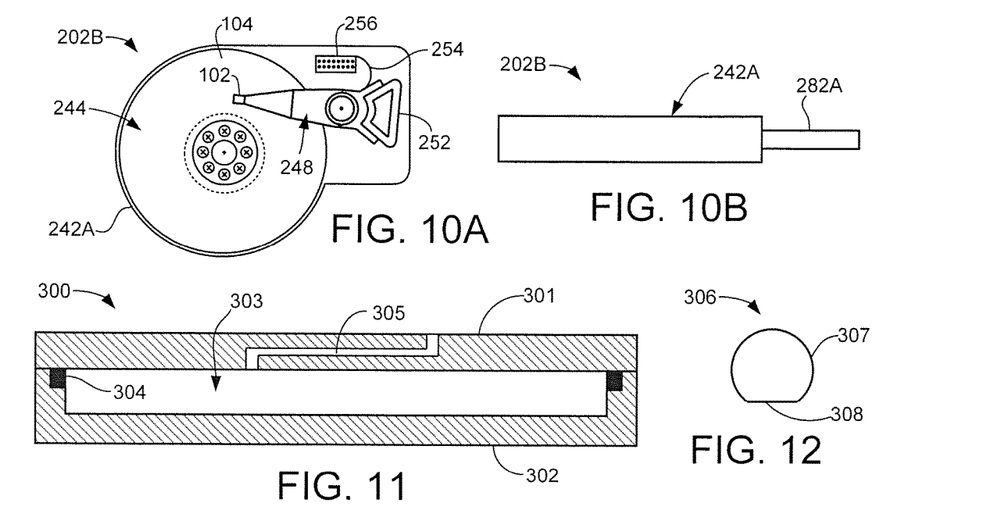
FIGS. 10A and 10B show alternative configurations for the cartridge.
FIG. 11 shows a schematic depiction of a cartridge housing.
FIG. 12 shows a keyed activation shaft of the access station.

FIGS. 10A and 10B show top plan and elevational representations of another HDI cartridge 202B. The cartridge 202B is similar to the cartridge 202 in FIG. 9A and has a sealed housing 242A with a non-standard shape with curvilinearly extending features. A thinned section 282A accommodates rotational movement of the actuator 248.

FIG. 11 shows a sealed housing 300 corresponding to the sealed housings 242, 242A discussed above. The housing 300 is shown schematically and not to scale with various features exaggerated for clarity of illustration.

The housing 300 is formed by upper and lower housing members 301 and 302 which mate together to form an enclosure with interior sealed space 303 configured to accommodate one or more HDIs as described above. An annular sealing gasket 304 extends along a periphery of the lower member 302 to establish a fluidic seal at the junction between the upper and lower members 301, 302.

In some cases, the upper member 301 can be characterized as a substantially planar top cover and the lower member 302 can be characterized as a bathtub-shaped base deck. Other housing configurations can be used such as a clamshell type housing, etc. It is contemplated that the sealed housings of the present disclosure will seal the associated cartridges against the surrounding environment external to the housings.

As depicted in FIG. 11, the sealed housing 300 is characterized as a vented housing. A pressure equalization vent 305 extends through the upper member (top cover) 301. The vent 305 provides a thin, circuitous, elongated path from the interior 303 to the surrounding environment. The vent 305 allows for the equalization of the internal atmospheric pressure within the housing 300 to that of the surrounding atmosphere, while restricting the ingress of airborne contaminants into the interior of the housing. To the extent that particulates may enter the vent 305, such particulates will tend to collect and adhere to the side walls of the circuitous path rather than passing into the interior 303. Thus, the vented housing configuration in FIG. 11 is sealed in the context of being sealed against the introduction of external particulates that could interfere with the HDI(s) within the interior 303. The vented housing is particularly suitable when normal atmospheric air is used (e.g., nominally 78% N, 21% O, etc.) within the interior 303.

In alternative embodiments, the housing 300 may be characterized as a hermetically sealed housing by eliminating the vent 305. In this case, the housing 300 is completely sealed against the surrounding atmosphere and is configured to retain isolated atmospheres such as inert gasses (e.g., He, N, etc.) in the interior 303 at a selected concentration (such as 95% or greater, etc.). In this latter case, suitable materials will be used to ensure the entrapped interior environment remains at an operative concentration for the operational lifetime of the cartridge.

FIG. 12 is a schematic depiction of a keyed engagement shaft 306. The shaft 306 has a substantially D-shape, with a cylindrical outer surface portion 307 and a flat (key) portion 308. The non-symmetric shape of the shaft 306 enables angular registration and locking of the shaft to an inserted hub with corresponding features (see e.g., FIGS. 9A-9B).

In some cases, the respective spindle and VCM shafts 280, 288 may be supplied with these or similar types of keyed features. Alternatively, the inserted shafts may be symmetric, such as cylindrical, and electronic circuitry may be used to detect the relative orientations of the respective motors and hubs. Compliant materials can be provided on the hubs and/or shafts to further ensure and maintain mechanical engagement once inserted.

Figure 13:
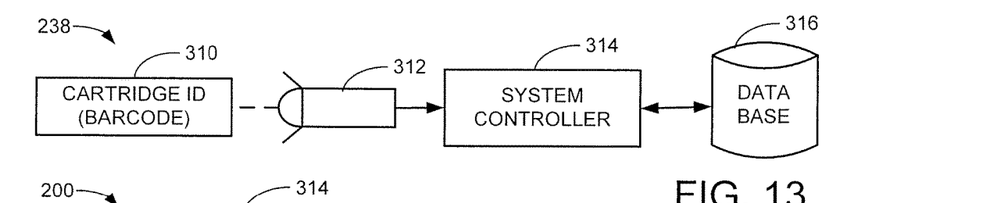
FIG. 13 shows a sensor module of the access station.

FIG. 13 shows aspects of the cartridge reader module 238 of FIG. 7 in further embodiments. Each of the cartridges 202 may each be supplied with external indicia in a machine and/or human readable format such as in the form of a cartridge identification (ID) value that uniquely identifies the associated cartridge. In some cases, at least a portion of this information may be in the form of a barcode on an externally applied adhesive label.

An optical reader 312 is configured to detect and decode the information from the label. The reader 312 supplies this information to a system controller circuit 314, which may form a portion of the host I/F and control circuit 208 of FIG. 4. The controller can access one or more data bases 316 arranged as data structures in an associated memory to ensure that the correct cartridge has been loaded. Information associated with the detected cartridge can be retrieved from the system memory 210 such as firmware, parameters, control settings and other suitable data required to enable the access station 206 to activate the loaded cartridge and carry out data transfers therewith. Such features may also be stored on one or more of the discs in the cartridge at a designated position. The density of this data could be much lower to improve data integrity and ease of retrieval of the information during initialization.

Figure 14:
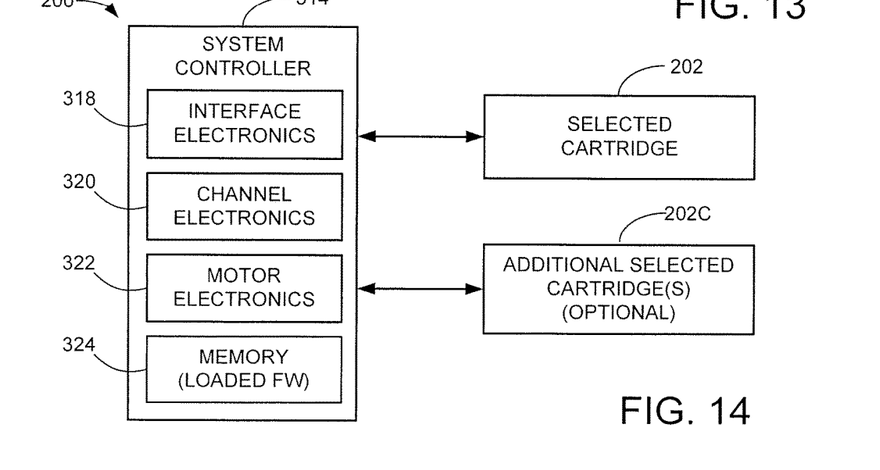
FIG. 14 shows interaction by the system with multiple cartridges concurrently.

FIG. 14 shows aspects of the cartridge library archive system 200 in further detail in accordance with some embodiments. The system controller 314 referenced in FIG. 12 can operate to control various aspects of the system discussed above as now generally referred to as host interface electronics 318, channel electronics 320 and motor electronics 322. In some cases, a new firmware set including required programming to operate the associated cartridge(s) as well as associated control parameters and other data is loaded to a local memory 324.

The embodiments discussed thus far have contemplated the loading of a single cartridge 202 at a time for access operations. In further embodiments, groups (subsets) of the cartridges may be selected from among the population of cartridges to carry out concurrent data accesses. This optional latter case is depicted by the additional cartridges 202C in FIG. 13. It will be appreciated that such operation would generally require additional capabilities within the access station 206 to allow multiple devices to be operated concurrently, such as multiple sets of external spindle motors, VCMs, control electronics, etc.

An advantage of this approach is that multi-device data storage techniques, such as RAID (redundant arrays of independent discs), inter-device NVMe namespaces, etc. can be implemented once the required subset of cartridges have been loaded. Multiple transport mechanisms and/or the bundling of existing cartridges into associated subgroups can further be used to reduce the time required to load the requested cartridges. In one non-limiting example, a system may be provided with several hundred cartridges which are accessed in groups of up to sixteen (16) cartridges at a time. Other respective numbers of cartridges and subgroup sizes can be used as desired.

It will be noted that all memory types have their own associated advantages and disadvantages. At present, solid-state memory (e.g., solid-state drives with NAND flash, etc.) are often used to provide support for hot data transfers, while slower forms of memory such as hybrid SSDs (both flash and rotatable media), HDDs, optical discs and tape may be used as required to establish slower, longer term storage needs for the system. Nevertheless, the random access nature of rotatable magnetic storage media, as well as the greater data densities and transfer rates associated therewith make rotatable magnetic recording media superior in many ways to optical discs and magnetic tape from a performance standpoint.

For example, optical discs tend to be write once or pre-recorded, tend to use constant linear velocity techniques (so the discs need to be sped up or slowed down depending on the radius of the optical transducer), and cannot use shingled track techniques to enhance data densities due to optical interference from adjacent symbols. Similarly, magnetic tape is sequential and incurs significant latencies for random accesses since the respective tape spools need to operate to advance the linear tape to the selected location. Thus, it is believed that a cold storage solution using HDI cartridges as described herein can provide significantly enhanced data storage capacity and data transfer rate performance over existing solutions (e.g., optical disc, tape) at comparable cost levels.

Figure 15:
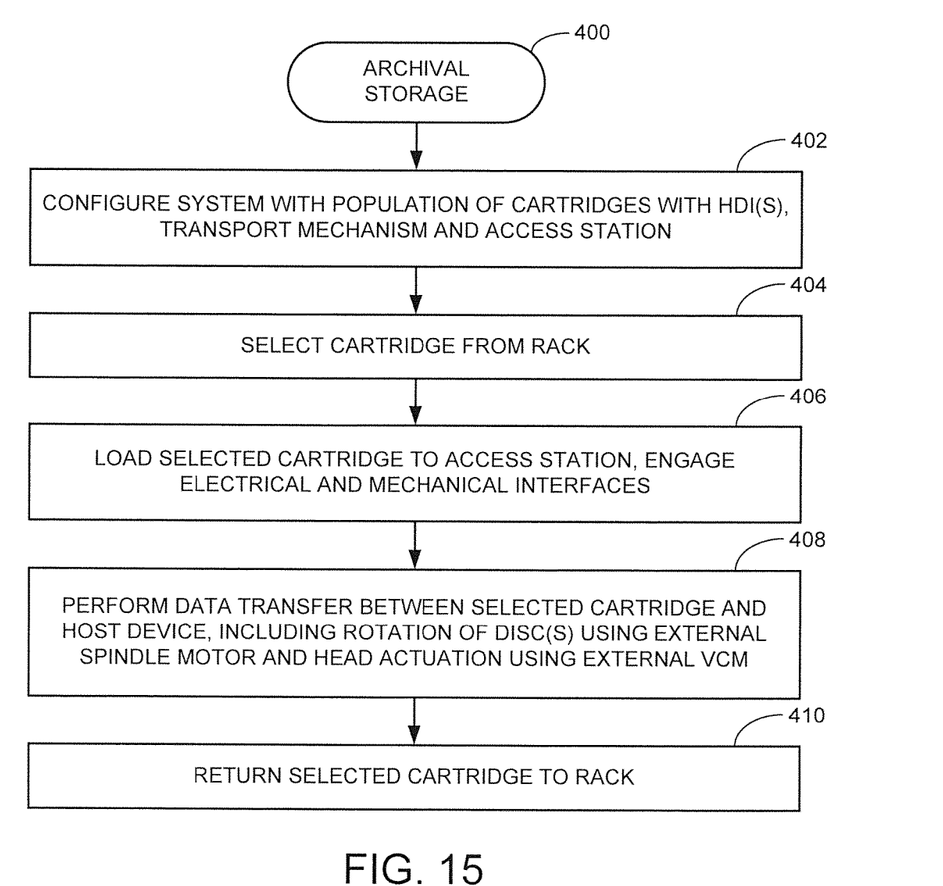
FIG. 15 is a flow chart for an archival storage routine.

FIG. 15 shows an archival storage routine 400 to operate various operational steps carried out in accordance with some embodiments. A cartridge library archival system such as 200 is configured at step 402 with a population of cartridges (such as 202, 202A, 202B, 202C) each having at least one magnetic HDI as described above. The system is further provided with a transport system such as 204 adapted to individually or collectively move one or more of the cartridges to an access station such as 206.

During operation, a selected cartridge (or subset of cartridges) is identified from the storage rack 212 at step 404. Each selected cartridge is loaded at step 406 to the access station to engage the appropriate electrical and mechanical interfaces.

A data transfer operation is thereafter carried out at step 408 with each loaded cartridge. This operation includes operation of an external spindle motor such as 234 of the access station to rotate the rotatable magnetic media at a selected rotational velocity, and the operation of an external VCM such as 236 of the access station to position the head(s) of the HDI(s) to various access locations (e.g., tracks) on the disc(s).

Once the data transfer operation is completed, each selected cartridge is removed and returned to the storage rack at step 410, after which the foregoing steps are repeated as required responsive to various host commands supplied by the external host.

Figure 16:
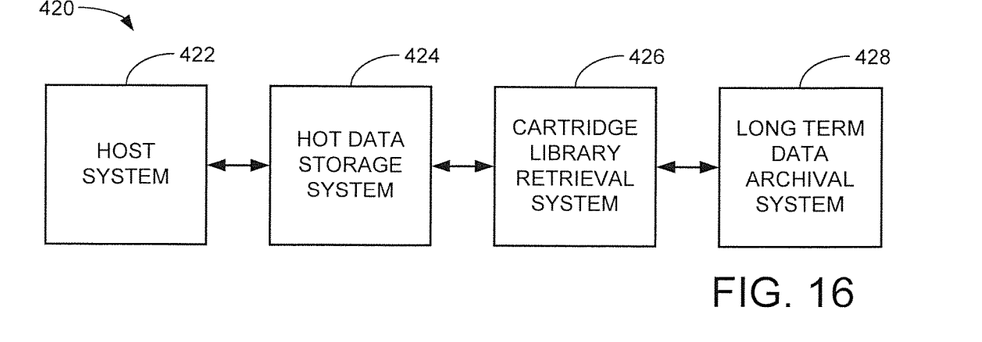
FIG. 16 shows a memory hierarchy useful in accordance with some embodiments.

FIG. 16 shows a hierarchical memory system 420 in accordance with further embodiments. It is contemplated that the memory system 420 processes data from a host system 422 in accordance with requirements provided by the host system. The memory system 420 includes a hot data storage system 424, a cartridge library retrieval system 426 and a slower data archival system 428.

The hot data storage system 424 may include an array of data storage devices such as SSDs, hybrid devices, HDDs, etc. that are concurrently operated and can be accessed with a relatively low latency time. Data sets from the hot data storage system 424 can be ported, from time to time, to the cartridge library retrieval system 426, which will generally correspond to the system 200 discussed above. While providing slower performance as compared to the system 424, the system 426 will nonetheless provide data transfer performance comparable to HDD performance once the selected cartridges have been loaded.

As further desired, data sets from the cartridge library retrieval system 426 can in turn be migrated to the slower long term data archival system 428, which may incorporate optical discs or magnetic tape as the media for data storage. While data retention capabilities in the system 426 are contemplated as being equal or exceeding that of the system 428, it is contemplated that the system will migrate lower priority data to the slower memory of the system 428 for historical data retention purposes.

It will now be appreciated that the various embodiments presented herein can provide a number of benefits. By providing each of the HDI cartridges with at least one internal HDI, compatibility and recording densities/performance of each head/disc combination can be assured to match that of current generation HDDs. Because disc stacks can provide significant data capacities and sustained data write streaming capabilities, cartridges can be loaded to receive large volumes of data in a fast and efficient manner. By staggering the loading of cartridges (e.g., loading a first cartridge and engaging a data transfer while queuing up subsequent cartridges), substantially no latencies in data transfers can be obtained while a population of cartridges are filled. Accesses can similarly be streamlined through the use of groups of cartridges, the preloading of cartridges, etc.

At the same time, significant cost savings can be provided since, for a population of N cartridges, the component and installation costs associated with various expensive elements such as processors, channels, preamps and motors can be consolidated into the access station, providing only a single set or reduced set (e.g., 1 or a few) of these elements rather than N elements, as in a system that requires the use of full HDDs for each cartridge.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a plurality of portable data storage cartridges each comprising a sealed housing which encloses at least one head-disc interface (HDI) comprising a magnetic data transducer adjacent a rotatable data recording medium; and
   an access station comprising control electronics configured to transfer data signals between a memory and the transducer of a selected cartridge loaded to the access station, the access station further comprising an external voice coil motor (VCM) configured to engage and advance the transducer of the selected cartridge across a recording surface of the medium.

2. The apparatus of claim 1, wherein the access station further comprises an external spindle motor configured to engage and advance the medium at a selected rotational velocity during movement of the transducer across the recording surface.

3. The apparatus of claim 1, wherein each cartridge further comprises an actuator which supports the transducer adjacent the medium, the actuator having an actuation feature which is engaged by the external VCM to advance the actuator.

4. The apparatus of claim 3, wherein the housing has a first housing height dimension in an axial direction parallel to an axis of rotation of the medium proximate the HDI, and wherein the housing has a second, reduced housing height dimension parallel to the first dimension proximate the actuation feature.

5. The apparatus of claim 1, wherein each cartridge further comprises a rotary actuator having a main body rotatable about an actuator pivot point adjacent an outermost perimeter of the medium, an actuator arm which extends from the main body toward the medium to support the transducer, and a voice coil which extends from the main body opposite the actuator arm, and wherein the external VCM comprises a pair of opposing VCM magnets separated by an insertion gap, a portion of the sealed housing and the voice coil extending into the insertion gap between the VCM magnets to form a magnetic circuit configured to move the transducer, the portion of the sealed housing comprising a non-magnetic material to reduce interference with the magnetic circuit.

6. The apparatus of claim 1, wherein each cartridge further comprises a rotary actuator having a main body rotatable about an actuator pivot point adjacent an outermost perimeter of the medium, an actuator arm which extends from the main body toward the medium to support the transducer, and a permanent magnet which extends from the main body opposite the actuator arm, and wherein the external VCM comprises a voice coil, a portion of the sealed housing and the permanent magnet extending adjacent the voice coil to form a magnetic circuit configured to move the transducer, the portion of the sealed housing comprising a non-magnetic material to reduce interference with the magnetic circuit.

7. The apparatus of claim 1, wherein each cartridge further comprises a rotary actuator having a main body rotatable about an actuator pivot point adjacent an outermost perimeter of the medium, an actuator arm which extends from the main body toward the medium to support the transducer, and an actuator hub adjacent an actuator aperture extending through the housing, the actuator hub axially aligned with the actuator pivot point, and wherein the external VCM comprises an actuator shaft which extends through the actuator aperture to contactingly engage the actuator hub and rotate the main body about the actuator pivot point to translate the head across the medium.

8. The apparatus of claim 1, wherein the access station further comprises a host interface control circuit configured to direct write signals to the transducer to write a sequence of partially overlapping shingled tracks to a recording surface of the medium.

9. The apparatus of claim 1, wherein the sealed housing is characterized as a vented housing comprising first and second housing members which matingly engage to form a sealed interior environment in which the HDI is disposed, wherein a selected one of the first or second housings has a vent aperture as an elongated passageway to equalize an atmospheric pressure within the sealed interior environment with an atmospheric pressure of an external surrounding environment.

10. The apparatus of claim 1, wherein the sealed housing is characterized as a hermetically sealed housing which encloses an internal atmosphere at a concentration of at least 95%.

11. The apparatus of claim 1, further comprising a transport mechanism configured to selectively load each of the cartridges in turn between an active location within the cabinet space in which the cartridges are in a deactivated state to an active location proximate the access station in which the cartridges are in an activated state.

12. The apparatus of claim 1, wherein the access station is further configured to concurrently apply data signals and VCM activation to a subset of the cartridges loaded to the access station.

13. A cartridge library archival system comprising:
a storage enclosure;
a population of data storage cartridges arranged within the storage enclosure, each cartridge comprising a sealed housing in which is disposed at least one head-disc interface (HDI) comprising a magnetic read/write data transducer and an associated magnetic recording disc, each cartridge further comprising a moveable actuator disposed within the associated sealed housing, the actuator having an actuator arm configured to support the data transducer and an actuation feature;
a transport mechanism configured to selectively transfer the cartridges from an inactive location within the storage enclosure to an active location within the storage enclosure; and
an access station proximate the active location comprising an electrical interface and a mechanical that respectively mate with a selected cartridge loaded to the active location, the electrical interface configured to supply a transfer of data for recording to the disc by the actuator of the selected cartridge, the mechanical interface comprising an external spindle motor configured to engage and rotate the disc of the selected cartridge at a selected rotational velocity, and an external voice coil motor (VCM) configured to engage the actuation feature of the actuator of the selected cartridge to advance the transducer adjacent the disc responsive to input control currents supplied to the VCM.

14. The system of claim 13, wherein the actuation feature comprises a voice coil which extends from a main body of the actuator of the selected cartridge within the sealed housing, and wherein the external VCM comprises a pair of spaced apart permanent magnets which magnetically interact through a portion of the sealed housing with the voice coil to advance the transducer.

15. The system of claim 13, wherein the actuation feature comprises an actuator hub axially aligned with a pivot point of the actuator, and wherein the external VCM comprises an actuator shaft which extends through an aperture in the sealed housing to engage and rotate the actuator hub to advance the transducer.

16. The system of claim 13, wherein each cartridge further comprises a flex circuit assembly with a flex circuit having a dynamic loop that interconnects the actuator to a bulkhead connector that extends through a sidewall of the sealed housing, and wherein the electrical interface of the access station interconnects with the bulkhead connector to pass data signals to the head.

17. The system of claim 13, wherein the access station further comprises a read/write channel circuit to condition data during read and write operations with the HDI.

18. The system of claim 13, wherein the access station further comprises a servo control circuit to position the transducer of the HDI adjacent data tracks on the disc responsive to servo data transduced from the disc by the transducer.

19. The system of claim 13, wherein the population of cartridges is a total number M cartridges, wherein the access station is configured to carry out concurrent data transfer operations on a subset N cartridges where N is less than M.

20. The system of claim 19, further comprising a controller circuit configured to direct a succession of cartridges to be loaded by the transport mechanism to the access station so that a first cartridge is being loaded and coupled to the electrical and mechanical interfaces while data transfer operations are carried out with a second cartridge.

* * * * *